Oct. 4, 1938.  J. W. RUHSTORFER  2,131,972
BRAKE AND ACCELERATOR CONTROL
Filed Sept. 21, 1936

Inventor
John W. Ruhstorfer

By

Attorney

Patented Oct. 4, 1938

2,131,972

UNITED STATES PATENT OFFICE 2,131,972

BRAKE AND ACCELERATOR CONTROL

John W. Ruhstorfer, Detroit, Mich.

Application September 21, 1936, Serial No. 101,748

1 Claim. (Cl. 192—3)

This invention relates to motor vehicle controls and particularly to accelerator and brake controls.

In present common practice, it is necessary, in braking a motor vehicle, to transfer pressure from an accelerator pedal to a brake pedal positioned some distance to one side of the accelerator pedal. The brake pedal, moreover, is usually spaced considerably higher from the floor board than the accelerator pedal, so that the operator, in transferring pressure, must raise his foot some distance while moving it laterally. The time consumed by these motions is sufficient to cause accidents, particularly in the case of vehicles traveling at considerable speed.

The object of the invention is to adapt the accelerator and brake of a vehicle to be controlled by diverse motions of the same foot pedal, in such a manner as to greatly reduce the time and effort requisite to shift from one control to the other.

These and various other objects are attained by the construction hereinafter described and illustrated in the accompanying drawing, wherein.

Figure 1:
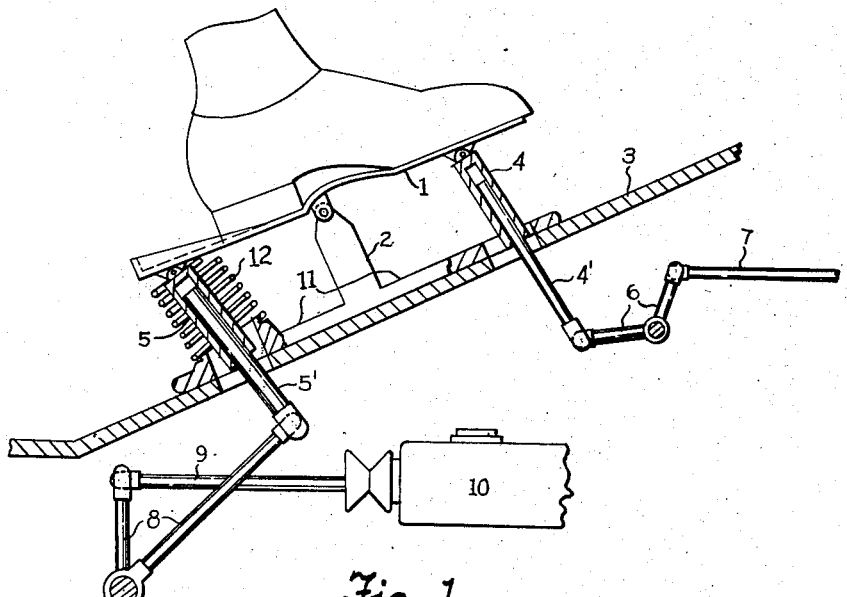
Fig. 1 is a view in vertical sectional elevation of the improved control mechanism, a non-accelerating and non-braking position being shown.
Figure 2:
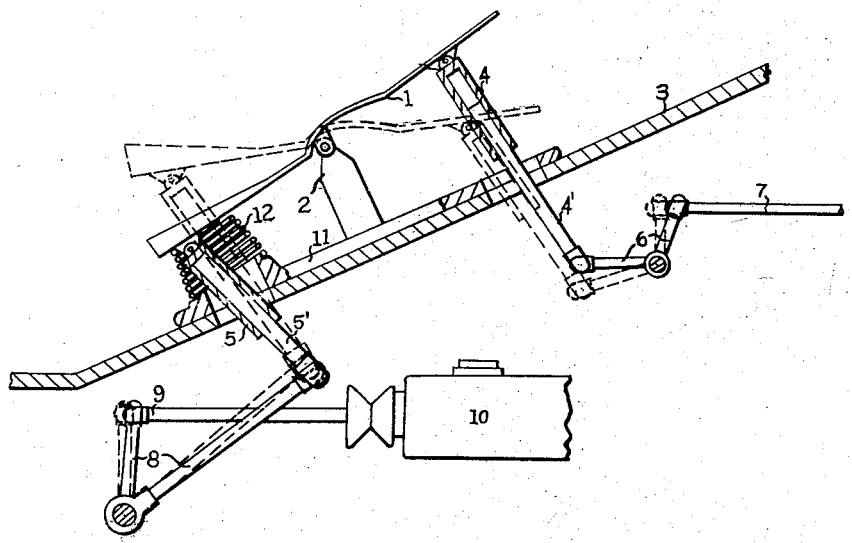
Fig. 2 is a similar view, showing however, a braking position in full lines and accelerating position in dash lines.

In these views, the reference character 1 designates a foot pedal, pivotally surmounting a bracket 2 rising from the usual inclined floor board 3 of a motor vehicle. Said pedal projects forwardly and rearwardly from its pivot, roughly conforming in shape to the sole of a shoe.

Pivoted to said pedal, therebeneath, are accelerator and brake control rods 4, 4' and 5, 5'. The two-part construction of said rods affords lost motion necessary to allow a pedal actuation of either rod, without hindrance by the other. Thus the upper members 4 and 5 are sleeves closed at their upper ends, the lower member 4' and 5' being telescoped within the upper members. The rod 4, 4' acts through a bell-crank 6 on a rod 7, leading in the usual manner to the throttle (not shown), and the rod 5, 5' is effective through a bell-crank 8 on a rod 9, actuating a brake (not shown) through any suitable mechanism. As illustrated, the rod 9 leads to a hydraulic brake cylinder 10.

It is preferred to form the bracket 2 with a base 11, extending forwardly and rearwardly and formed with openings registering with those of the floor board to accommodate the two control rods. It is also preferred to interpose a coiled spring 12 between the rear end of the pedal and said base, such spring occupying a surrounding relation to the rod 5, 5', and tending to normally establish the non-actuating, intermediate position of the pedal, illustrated in Fig. 1.

In accelerating, the operator depresses the forward end of the pedal, forcing the rod 4, 4' downward to a desired extent to accomplish a corresponding throttle opening. In braking, the rear end of the pedal is depressed. In exercising either control, the telescoping two-part construction of the rods permits the other control mechanism to remain undisturbed.

It is apparent that the illustrated arrangement permits a much more rapid shifting from one control to the other than is possible with installations now commonly used, and the exertion required of the operator is furthermore materially decreased.

The invention is presented as including all such modifications and changes as come within the scope of the following claim.

What I claim is:

A vehicle control mechanism, comprising a fulcrum member, a foot pedal mounted at its mid portion on the fulcrum member, an accelerator actuator downwardly extending from one end portion of the foot pedal, and a brake actuator downwardly extending from the other end portion of the pedal, each of said actuators being extensible to afford a lost motion upward of the corresponding end of the pedal, as the other end of the pedal is taking effect on the other actuator, a spring encircling one of such actuators, a supporting plate carrying said fulcrum member, and formed with apertures through which said actuators extend, and a boss integral with the plate, and surrounding one of the apertures, for properly positioning and seating the lower portion of said spring.

JOHN W. RUHSTORFER.